(12) United States Patent
Kumagae

(10) Patent No.: US 6,449,868 B1
(45) Date of Patent: Sep. 17, 2002

(54) MEASURING APPARATUS FOR A POWER ROLLER UNIT FOR A TOROIDAL TYPE CONTINUOUS VARIABLE SPEED TRANSMISSION

(75) Inventor: Mitsuo Kumagae, Hanyu (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/709,545

(22) Filed: Nov. 13, 2000

(30) Foreign Application Priority Data

Nov. 11, 1999 (JP) .......................................... 11-320641

(51) Int. Cl.[7] ................................................ G01B 5/00
(52) U.S. Cl. .............................. 33/833; 33/548; 33/549; 33/600
(58) Field of Search ........................ 33/600, 606, 549, 33/550, 548, 555, 712, 833, 832, 573

(56) References Cited

U.S. PATENT DOCUMENTS

| | | | |
|---|---|---|---|
| 5,497,559 A | * | 3/1996 | Okumura et al. .............. 33/517 |
| 5,557,854 A | * | 9/1996 | Fujioka ......................... 33/517 |
| 6,035,541 A | * | 3/2000 | Choi ............................. 33/517 |
| 6,085,430 A | * | 7/2000 | Chen et al. .................... 33/550 |

FOREIGN PATENT DOCUMENTS

| | | |
|---|---|---|
| JP | 62-71465 | 5/1987 |
| JP | 1-173552 | 12/1989 |
| JP | 11-153203 | 6/1999 |

* cited by examiner

Primary Examiner—Diego Gutierrez
Assistant Examiner—Mirellys Jagan
(74) Attorney, Agent, or Firm—Miles & Stockbridge P. C.

(57) ABSTRACT

A measuring apparatus for a power roller unit for a toroidal type continuous variable speed transmission, the power roller unit having a trunnion with concentric pivot portions at opposite ends thereof, a pair of bearings disposed around the pivot portions, a displaceable shaft rotatably supporting a pivot support shaft disposed in a hole formed in the trunnion, and a power roller rotatably supported around the pivot support shaft, the measuring apparatus comprising at least one pedestal having an upper surface adapted to support the pivot portions of the trunnion, a hold-down actuator adapted to press the bearings against the upper surface of the at least one pedestal, and a power roller hold-down actuator adapted to press the power roller toward the trunnion, a drive actuator adapted to displace at least one of the power roller and the displaceable shaft, and a measuring device that measures the displacement of the at least one of the power roller and the displaceable shaft.

14 Claims, 7 Drawing Sheets

PRIOR ART FIG. 3
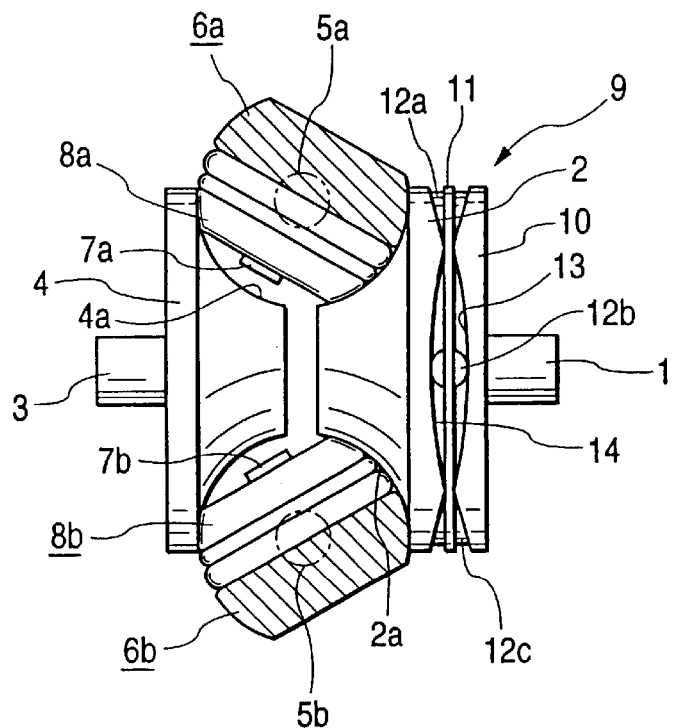
PRIOR ART FIG. 4
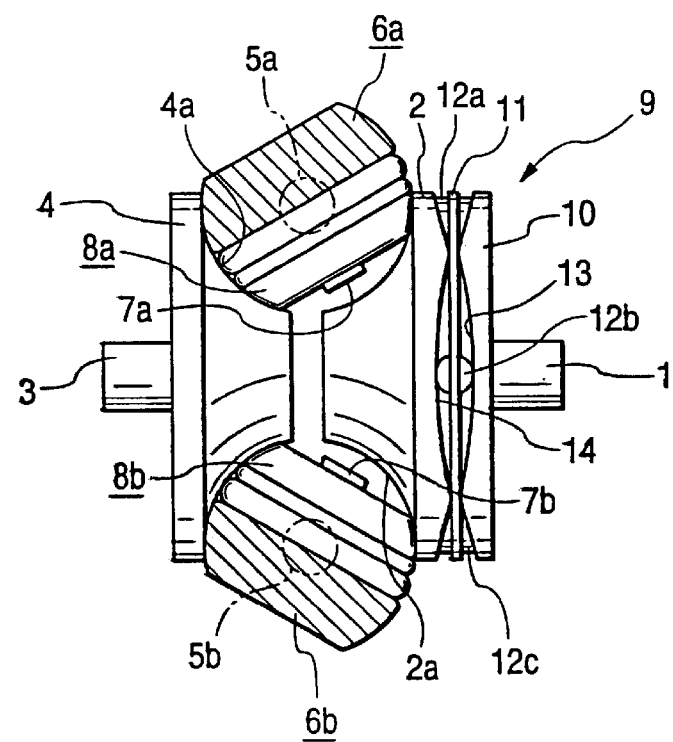

MEASURING APPARATUS FOR A POWER ROLLER UNIT FOR A TOROIDAL TYPE CONTINUOUS VARIABLE SPEED TRANSMISSION

BACKGROUND OF THE INVENTION

1. Field of the Invention

A measuring apparatus for a power roller unit for a toroidal type continuous variable speed transmission according to this invention facilitates the work of assembling a toroidal type continuous variable speed transmission utilized, for example, as the speed change unit of a transmission for an automobile or a transmission for various industrial machines and also improves the assembling accuracy to thereby achieve an improvement in performance.

2. Related Background Art

It has been studied to use a toroidal type continuous variable speed transmission as shown in FIGS. 3 and 4 of the accompanying drawings as a transmission for an automobile. In this toroidal type continuous variable speed transmission, as disclosed, for example, in Japanese Utility Model Application Laid-Open No. 62-71465, an input side disc 2 is supported concentrically with an input shaft 1, and an output side disc 4 is fixed to the end portion of an output shaft 3 disposed concentrically with the input shaft 1. Trunnions 6a, 6b pivotally movable about pivots 5a, 5b lying at locations twisted relative to the input shaft 1 and the output shaft 3 are provided inside a casing containing the toroidal type continuous variable speed transmission therein.

That is, these trunnions 6a, 6b have the pivots 5a, 5b provided concentrically with each other on the outer sides of the opposite end portions thereof. Also, the base end portions of displaceable shafts 7a, 7b are supported on the intermediate portions of the trunnions 6a, 6b and the trunnions 6a, 6b are pivotally moved about the pivots 5a, 5b, whereby the angles of inclination of the displaceable shafts 7a, 7b are made adjustable. Power rollers 8a, 8b are rotatably supported around the displaceable shafts 7a, 7b supported on the trunnions 6a, 6b. These power rollers 8a, 8b are sandwiched between the mutually opposed inner sides 2a, 4a of the input side and output side discs 2 and 4. Each of these inner sides 2a, 4a has its cross-section forming a concave surface obtained by being rotated along an arc centering around the pivots 5a, 5b. The power rollers 8a, 8b formed into spherical convex surfaces and the inner sides 2a, 4a are in contact with each other. Hereinafter, the surfaces of the power rollers 8a and 8b which are in contact with the inner sides 2a and 4a, respectively, are referred to as the "peripheral surfaces" of the power rollers 8a and 8b.

A pressing apparatus 9 of the loading cam type is provided between the input shaft 1 and the input side disc 2, and the input side disc 2 is capable of being elastically pressed toward the output side disc 4 by this pressing apparatus 9. This pressing apparatus 9 is comprised of a cam plate 10 rotatable with the input shaft 1, and a plurality of (e.g. four) rollers 12a, 12b, 12c and 12d (not shown) held for rolling by a holder 11. A driving side cam surface 13 which is a concavo-convex surface extending in the circumferential direction is formed on that surface (the left side as viewed in FIGS. 3 and 4) of the cam plate 10 which abuts against the holder 11, and a driven side cam surface 14 of a similar shape is also formed on the outer side (the right side as viewed in FIGS. 3 and 4) of the input side disc 2. The plurality of rollers 12a to 12d are supported for rotation about radial axes with respect to the center of the input shaft 1.

When during the use of the toroidal type continuous variable speed transmission constructed as described above, the cam plate 10 rotates with the rotation of the input shaft 1, the driving side cam surface 13 presses the plurality of rollers 12a, 12b, 12c and 12d toward the driven side cam surface 14 formed on the outer side of the input side disc 2. As the result, the input side disc 2 is pressed against the plurality of power rollers 8a, 8b and at the same time, the input side disc 2 is rotated on the basis of the pressing between the driving side and driven side cam surfaces 13, 14 and the plurality of rollers 12a, 12b, 12c and 12d. The rotation of this input side disc 2 is transmitted to the output side disc 4 through the plurality of power rollers 8a, 8b, and the output shaft 3 fixed to this output side disc 4 is rotated.

When the rotational speed ratio (change gear ratio) between the input shaft 1 and the output shaft 3 is to be changed and first, deceleration is to be effected between the input shaft 1 and the output shaft 3, the trunnions 6a, 6b are pivotally moved in a predetermined direction about the pivots 5a, 5b. The displaceable shafts 7a, 7b are then inclined so that as shown in FIG. 3, the peripheral surfaces of the power rollers 8a, 8b may abut against the rather central portion of the inner side 2a of the input side disc 2 and the rather outer peripheral portion of the inner side 4a of the output side disc 4, respectively. When conversely, acceleration is to be effected, the trunnions 6a, 6b are pivotally moved in the opposite direction about the pivots 5a, 5b. The displaceable shafts 7a, 7b are then inclined so that as shown in FIG. 4, the peripheral surfaces of the power rollers 8a, 8b may abut against the rather outer peripheral portion of the inner side 2a of the input side disc 2 and the rather central portion of the inner side 4a of the output side disc 4, respectively. If the angle of inclination of the displaceable shafts 7a, 7b is made intermediate of the angles shown in FIGS. 3 and 4, an intermediate change gear ratio is obtained between the input shaft 1 and the output shaft 3.

Also, FIGS. 5 and 6 of the accompanying drawings show an example of a more embodied toroidal type continuous variable speed transmission described in the microfilm of Japanese Utility Model Application No. 63-69293 (Japanese Utility Model Application Laid-Open No. 1-73552). An input side disc 2 and an output side disc 4 are rotatably supported around a tubular input shaft 15 through needle bearings 16. Also, a cam plate 10 is spline-engaged with the outer peripheral surface of one end portion (the left end portion as viewed in FIG. 5) of the input shaft 15, and the movement thereof away from the input side disc 2 is blocked by a flange portion 17. This cam plate 10 and rollers 12a, 12b together constitute a pressing apparatus 9 of the loading cam type for rotating the input side disc 2 while pressing it toward the output side disc 4 with the rotation of the input shaft 15. An output gear 18 is coupled to the output side disc 4 by keys 19, 19, and the output side disc 4 and the output gear 18 are rotated in synchronism with each other.

In FIG. 6, the opposite end portions of a pair of trunnions 6a, 6b are supported on a pair of support plates 20a, 20b for pivotal movement and displacement in an axial direction (the front-to-back direction of FIG. 5 or the left to right direction as viewed in FIG. 6). That is, radial needle bearings 22 which are first radial bearings are provided between the outer peripheral surfaces of pivots 5 secured to the opposite end portions of the trunnions 6a, 6b and the inner peripheral surface of a circular hole 21 formed in each support plate 20. The outer peripheral surfaces of outer rings 23 constituting these radial needle bearings 22 are fitted as spherical convex surfaces in the circular holes 21 for pivotal movement and axial displacement.

In this manner, the displaceable shafts 7a, 7b are supported in circular holes 24a, 24b formed in the intermediate portions of the trunnions 6a, 6b supported for pivotal movement and axial displacement between the pair of support plates 20a, 20b. These displaceable shafts 7a, 7b have support shaft portions 25a, 25b and pivotally supporting shaft portions 26a, 26b parallel to and eccentric from each other. The support shaft portions 25a, 25b are rotatably supported inside the circular holes 24a, 24b through radial needle bearings 27a, 27b which are second radial bearings. Also, power rollers 8a, 8b are rotatably supported around the pivotally supporting shaft portions 26a, 26b through radial needle bearings 28a, 28b which are third radial bearings.

The pair of displaceable shafts 7a, 7b are provided at locations opposite by 180° relative to the input shaft 15. Also, the direction in which the pivotally supporting shaft portions 26a, 26b of these displaceable shafts 7a, 7b are eccentric relative to the support shaft portions 25a, 25b is the same direction (the right to left direction as viewed in FIG. 6) with respect to the direction of rotation of the input side and output side discs 2 and 4. Also, the direction of eccentricity is a direction substantially orthogonal to the direction of disposition of the input shaft 15. Accordingly, the power rollers 8a, 8b are supported for some displacement in the direction of disposition of the input shaft 15. As a result, even when the power rollers 8a, 8b tend to be displaced in the axial direction of the input shaft 15 (the left to right direction as viewed in FIG. 5 or the front to back direction of FIG. 6) due to the elastic deformation of the constituent members based on a great load applied to the constituent members in the transmitted state of the rotational force, this displacement can be absorbed without any unreasonable force being applied to each portion.

Also, between the outer sides of the power rollers 8a, 8b and the inner sides of the intermediate portions of the trunnions 6a, 6b, thrust ball bearings 29a, 29b which are first thrust bearings and thrust needle bearings 30a, 30b which are second thrust bearings are provided in series with one another with respect to the acting direction of a thrust load (a vertical direction as viewed in FIGS. 5 and 6), in the order from the outer sides of the power rollers 8a, 8b. The thrust ball bearings 29a, 29b support a load in the thrust direction applied to the power rollers 8a, 8b and yet permit the rotation of these power rollers 8a, 8b. Such thrust ball bearings 29a, 29b are comprised of a plurality of balls 31, circular ring-shaped retainers 32 retaining these balls 31 for rolling movement, and circular ring-shaped outer rings 33. The inner ring raceway tracks of these thrust ball bearings 29a, 29b are formed on the outer sides of the power rollers 8, and the outer ring raceway tracks of these thrust ball bearings 29a, 29b are formed on the inner sides of the outer rings 33.

Also, the thrust needle bearings 30a, 30b are comprised of races 34, retainers 35 and needles 36. The races 34 and the holders 35 are combined together for some displacement with respect to the rotational direction. Such thrust needle bearings 30a, 30b sandwich the races 34, between the inner sides of the trunnions 6a, 6b and the outer sides of the outer rings 33a, 33b with the races 34, abutting against the inner sides of the trunnions 6a, 6b. Such thrust needle bearings 30a, 30b support a thrust load applied from the power rollers 8a, 8b to the outer rings 33a, 33b and yet permit the pivotally supporting shaft portions 26a, 26b and the outer rings 33a, 33b to pivotally move about the support shaft portions 25a, 25b.

Further, driving rods 37a, 37b are coupled to one end portion (the left end portion as viewed in FIG. 6) of the trunnions 6a, 6b, and driving pistons 38a, 38b are secured to the outer peripheral surfaces of the intermediate portions of these driving rods 37a, 37b. These driving pistons 38a, 38b are oil-tightly fitted in driving cylinders 39a and 39b, respectively.

In the case of the toroidal type continuous variable speed transmission constructed as described above, the rotation of the input shaft 15 is transmitted to the input side disc 2 through the pressing apparatus 9. The rotation of this input side disc 2 in turn is transmitted to the output side disc 4 through the pair of power rollers 8a, 8b and further, the rotation of this output side disc 4 is taken out from an output gear 18. When the rotational speed ratio between the input shaft 15 and the output gear 18 is to be changed, the pair of driving pistons 38a, 38b are displaced in opposite directions. With the displacement of these driving pistons 38a, 38b, the pair of trunnions 6a, 6b are displaced in opposite directions, and for example, the lower power roller 8b in FIG. 6 is displaced to the right as viewed in FIG. 6 and the upper power roller 8a in FIG. 6 is displaced to the left as viewed in FIG. 6. As the result, the direction of a tangential force acting on the contact portions between the peripheral surfaces of these power rollers 8a, 8b and the inner sides 2a and 4a of the input side disc 2 and the output side disc 4, respectively, is changed. With the change in the direction of this force, the trunnions 6a, 6b pivotally move in opposite directions about the pivots 5a, 5b pivotally supported on the support plates 20a, 20b. As the result, as shown in FIGS. 3 and 4, the contact positions between the peripheral surfaces of the power rollers 8a, 8b and the aforementioned inner sides 2a, 4a change, and the rotational speed ratio between the input shaft 15 and the output gear 18 changes.

The adjustment of the rotational speed ratio between the input shaft 15 and the output gear 18 to a desired value is effected by regulating the amounts of movement of the driving pistons 38a, 38b. The regulation of the amounts of movement of these driving pistons 38a, 38b is effected by the engagement between precess cams, not shown, fixed to the end portions or the intermediate portions of the driving rods 37a, 37b and the spools or the sleeves of spool values, not shown. Also, when as described above, the transmission of the rotational force is to be effected between the input shaft 15 and the output gear 18, the power rollers 8a, 8b are displaced axially of the input shaft 15 on the basis of the elastic deformation of each constituent member and the displaceable shafts 7a, 7b pivotally supporting these power rollers 8a, 8b slightly rotate about the support shaft portions 25a, 25b. As the result of this rotation, the outer sides of the outer rings 33a, 33b of the thrust ball bearings 29a, 29b and the inner sides of the trunnions 6a, 6b are displaced relative to each other. Since the thrust needle bearings 30a, 30b are present between these outer sides and inner sides, the force required for this relative displacement is small. Accordingly, the force for changing the angles of inclination of the displaceable shafts 7a, 7b as described above may be small.

When assembling the toroidal type continuous variable speed transmission constructed and acting as described above, the constituent parts have heretofore been assembled in order inside a housing 40 (FIG. 6) containing the main body of this toroidal type continuous variable speed transmission therein. Accordingly, the deviation of the positional relations among the respective portions based on the integration of the dimensional errors of the constituent parts, and further whether the constituent parts function properly could be confirmed only after these constituent parts were all assembled in the housing 40. In contrast with this, to secure the efficiency and durability of the toroidal type continuous variable speed transmission, the positional relations among the constituent parts must be maintained highly accurate. Therefore, when the deviation of the positional relations of the respective portions becomes great on the basis of the integration of the dimensional errors of the constituent parts, the disassembly and reassembly of the toroidal type continuous variable speed transmission assembled in the housing 40 must be done to make this deviation small by the combination with other parts. When the work of assembling the toroidal type continuous variable speed transmission is done in this manner, the work of manufacturing the toroidal type continuous variable speed transmission is cumbersome and a reduction in cost cannot be achieved.

In view of such circumstances, a power roller unit 41 for a toroidal type continuous variable speed transmission as shown in FIGS. 7 and 8 of the accompanying drawings is described in Japanese Patent Application Laid-Open No. 11-153203. This power roller unit 41 for a toroidal type continuous variable speed transmission has radial needle bearings 22a, 22b which are first radial bearings provided around pivots 5b, 5b secured concentrically with each other to the opposite end surfaces of a trunnion 6. Also, the support shaft portion 25 of a displaceable shaft 7 comprising a support shaft portion 25 and a pivotally supporting shaft portion 26 parallel to and eccentric from each other is rotatably supported in a circular hole 24 formed in the intermediate portion of the trunnion 6 in a direction perpendicular to the axial direction of the pivots 5a, 5b, through a radial needle bearing 27 which is a second radial bearing.

Also, a power roller 8 is rotatably supported around the pivotally supporting shaft portion 26 through a radial needle bearing 28 which is a third radial bearing. Also, between the outer side of the power roller 8 and the inner side of the intermediate portion of the trunnion 6, a thrust ball bearing 29 and a thrust needle bearing 30 which are first and second thrust bearings, respectively, are provided in series with each other with respect to the acting direction of a thrust load. The trunnion 6, the radial needle bearings 22, 27, 28, the displaceable shaft 7, the power roller 8, the thrust ball bearing 29 and the thrust needle bearing 30 which are parts discrete from one another are pre-assembled into the positional relation after the completion of the assembly of the toroidal type continuous variable speed transmission before they are assembled to the toroidal type continuous variable speed transmission.

In the case of the power roller unit 41 for the toroidal type continuous variable speed transmission constructed as described above, the deviation of the positional relations among the respective portions based on the integration of the dimensional errors of the constituent parts, and further whether the constituent parts function properly can be confirmed before these constituent parts are assembled in the housing. Accordingly, without requiring the cumbersome work of disassembling and reassembling the entire toroidal type continuous variable speed transmission, the positional relations among the constituent parts can be maintained highly accurate to secure the efficiency and durability of the toroidal type continuous variable speed transmission.

SUMMARY OF THE INVENTION

As described above, Japanese Patent Application Laid-Open No. 11-153203 describes a power roller unit for a toroidal type continuous variable speed transmission which can efficiently effect the assembly of a toroidal type continuous variable speed transmission of high performance, but does not describe means capable of efficiently measuring whether the constituent parts of this power roller unit for the toroidal type continuous variable speed transmission function properly.

In view of such circumstances, the present invention has been made in order to realize a measuring apparatus which can efficiently measure whether the constituent parts of the above-described power roller unit for the toroidal type continuous variable speed transmission function properly.

Any of the measuring apparatuses of the present invention for a power roller unit for a toroidal type continuous variable speed transmission is for measuring the movement of the power roller unit for a toroidal type continuous variable speed transmission before the assembly thereof to the toroidal type continuous variable speed transmission. Also, the power roller unit for the toroidal type continuous variable speed transmission which is the object of measurement comprises a trunnion having concentric pivots secured to the opposite end surfaces thereof, a pair of first radial bearings provided around these two pivots, a circular hole formed in the intermediate portion of the trunnion in a direction perpendicular to the axial direction of the pivots, and a support shaft portion and a pivotally supporting shaft portion parallel to and eccentric from each other, and is provided with a displaceable shaft rotatably supporting the support shaft portion inside the circular hole through a second radial bearing, a power roller rotatably supported around the pivotally supporting shaft portion through a third radial bearing, and first and second thrust bearings provided between the outer side of this power roller and the inner side of the intermediate portion of the trunnion in series with each other with respect to the acting direction of a thrust load. The trunnion, the first, second and third radial bearings, the displaceable shaft, the power roller and the first and second thrust bearings which are parts discrete from one another are pre-assembled into the positional relation after the completion of the assembly of the toroidal type continuous variable speed transmission before they are assembled to the toroidal type continuous variable speed transmission.

Particularly, the measuring apparatus for a power roller unit for a toroidal type continuous variable speed transmission is provided with a pair of pedestals, hold-down means for a pivot, hold-down means for a power roller, pivotally driving means and pivotal displacement measuring means, the pedestals support the pivots provided at the opposite end portions of the trunnion on the upper surfaces thereof through the pair of first radial bearings with the power roller positioned above the trunnion. Also, the hold-down means for the pivot holds down the first radial bearings on the upper surfaces of the pedestals. Also, the hold-down means for the power roller holds down the power roller toward the trunnion. Also, the pivotally driving means presses the two diametrically opposite locations of the power roller with respect to the widthwise direction of the trunnion to thereby pivotally displace the power roller about the support shaft portion. Also, the pivotal displacement measuring means measures the amount of displacement of the power roller by the pivotally driving means.

Also, a measuring apparatus for a power roller unit for a toroidal type continuous variable speed transmission is provided with axially driving means and axial direction displacement measuring means, a pair of pedestals, hold-down means for a pivot and hold-down means for a power roller. The axially driving means presses the axially opposite end surfaces of the displaceable shaft to thereby displace this displaceable shaft axially thereof. Further, the axial direction displacement measuring means measures the amount of displacement of the displaceable shaft by the axially driving means with respect to the axial direction thereof.

According to the measuring apparatus of the present invention for a power roller unit for a toroidal type continuous variable speed transmission constructed as described above, the amount of displacement for judging whether the constituent parts of the power roller unit for the toroidal type continuous variable speed transmission function properly can be measured efficiently.

First, according to the measuring apparatus of the invention, the amount of pivotal displacement for judging Whether a displacement shaft rotatably supporting a power roller around the pivotally supporting shaft portion thereof through a third radial bearing is properly pivotally displaced about a support shaft portion supported relative to a trunnion by a second radial bearing provided inside a circular hole can be measured efficiently.

Also, according to the measuring apparatus of the invention, the amount of axial displacement for judging whether the displaceable shaft supporting the power roller for rotation and pivotal displacement relative to the trunnion is assembled to the trunnion and the power roller with a desired axial gap can be measured efficiently.

BRIEF DESCRIPTION OF THE DRAWINGS

FIG. 3 is a side view showing the basic construction of a toroidal type continuous variable speed transmission of the conventional type in the state during maximum deceleration.

FIG. 4 is a side view showing the basic construction of the toroidal type continuous variable speed transmission of the conventional type in the state during maximum acceleration.

DESCRIPTION OF THE PREFERRED EMBODIMENTS

Figure 1:
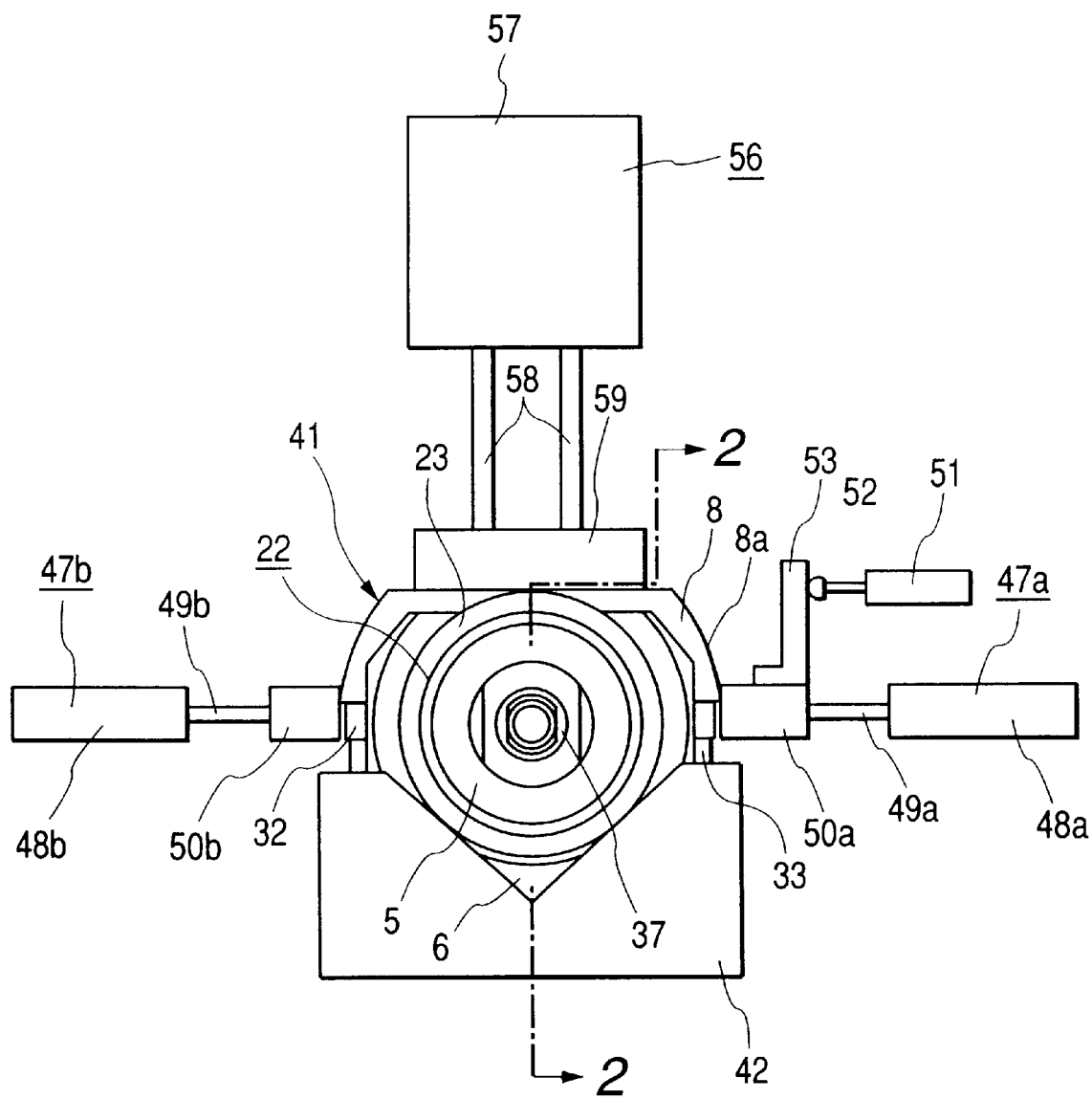
FIG. 1 is a partly omitted side view of an apparatus according to Embodiment 1 as it is seen from its end surface side.
Figure 2:
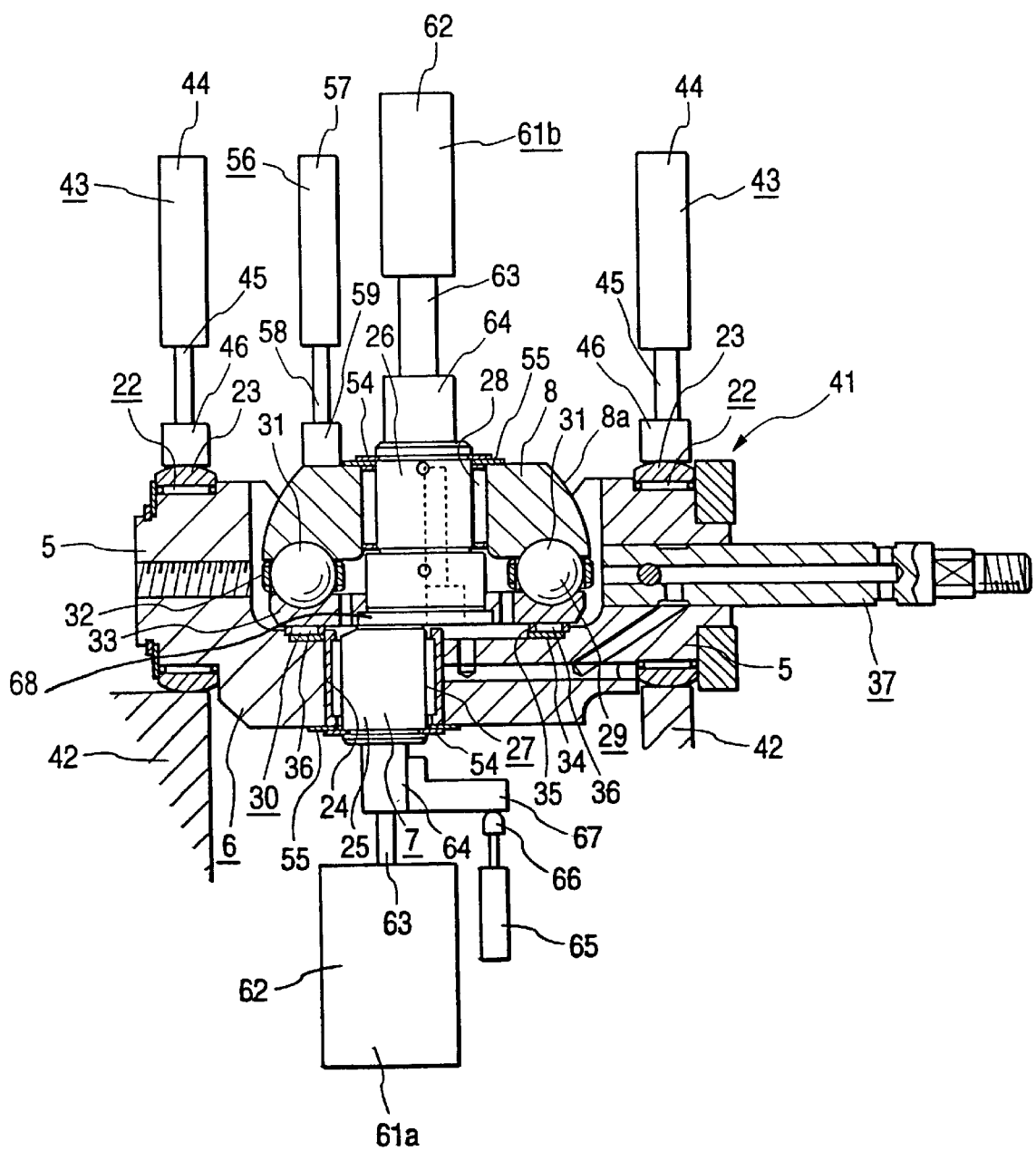
FIG. 2 shows a cross-section cut by line 2—2 in FIG. 1.
Figure 5:
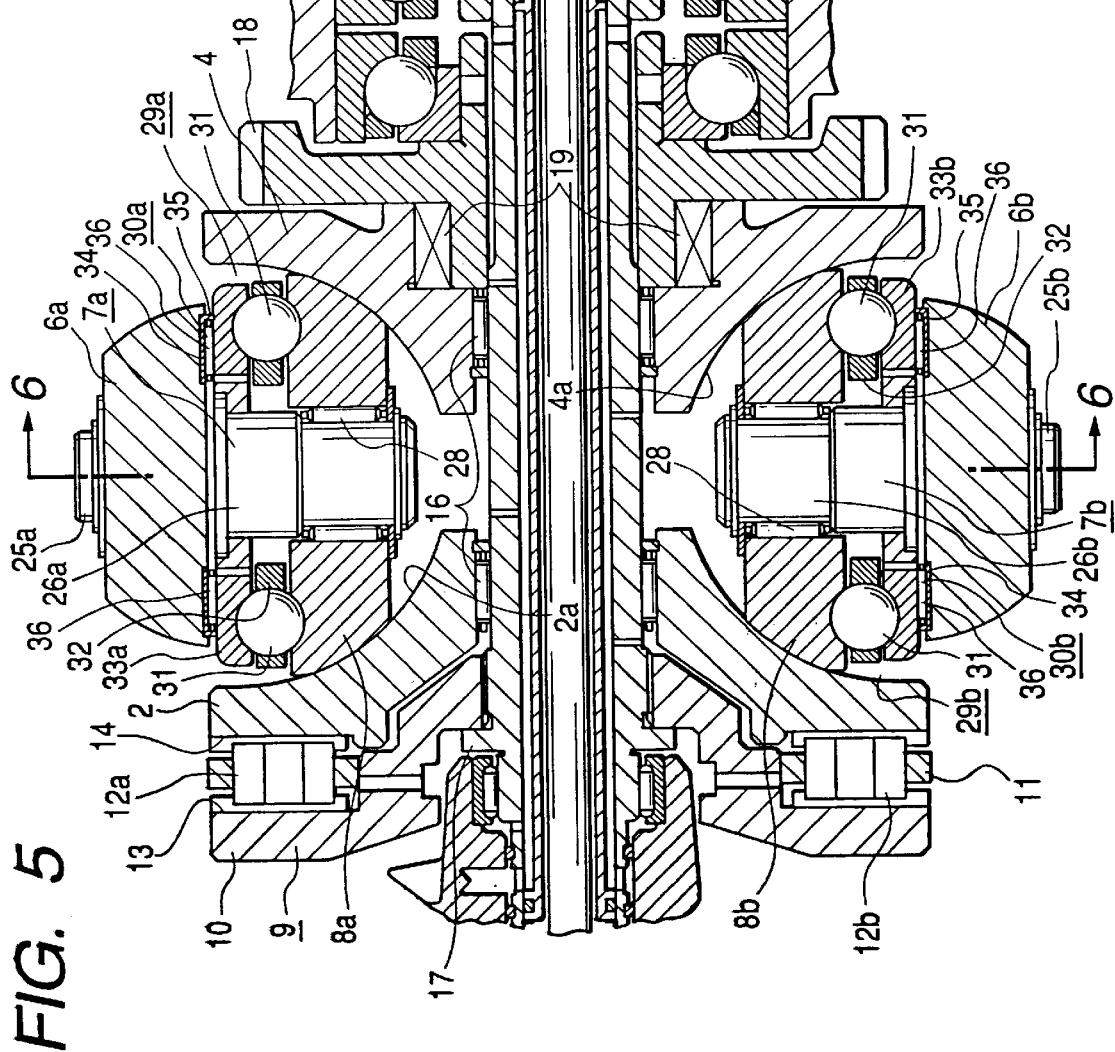
FIG. 5 is a cross-sectional view in the specific structure of an example of the toroidal type continuous variable speed transmission of the conventional type.
Figure 6:
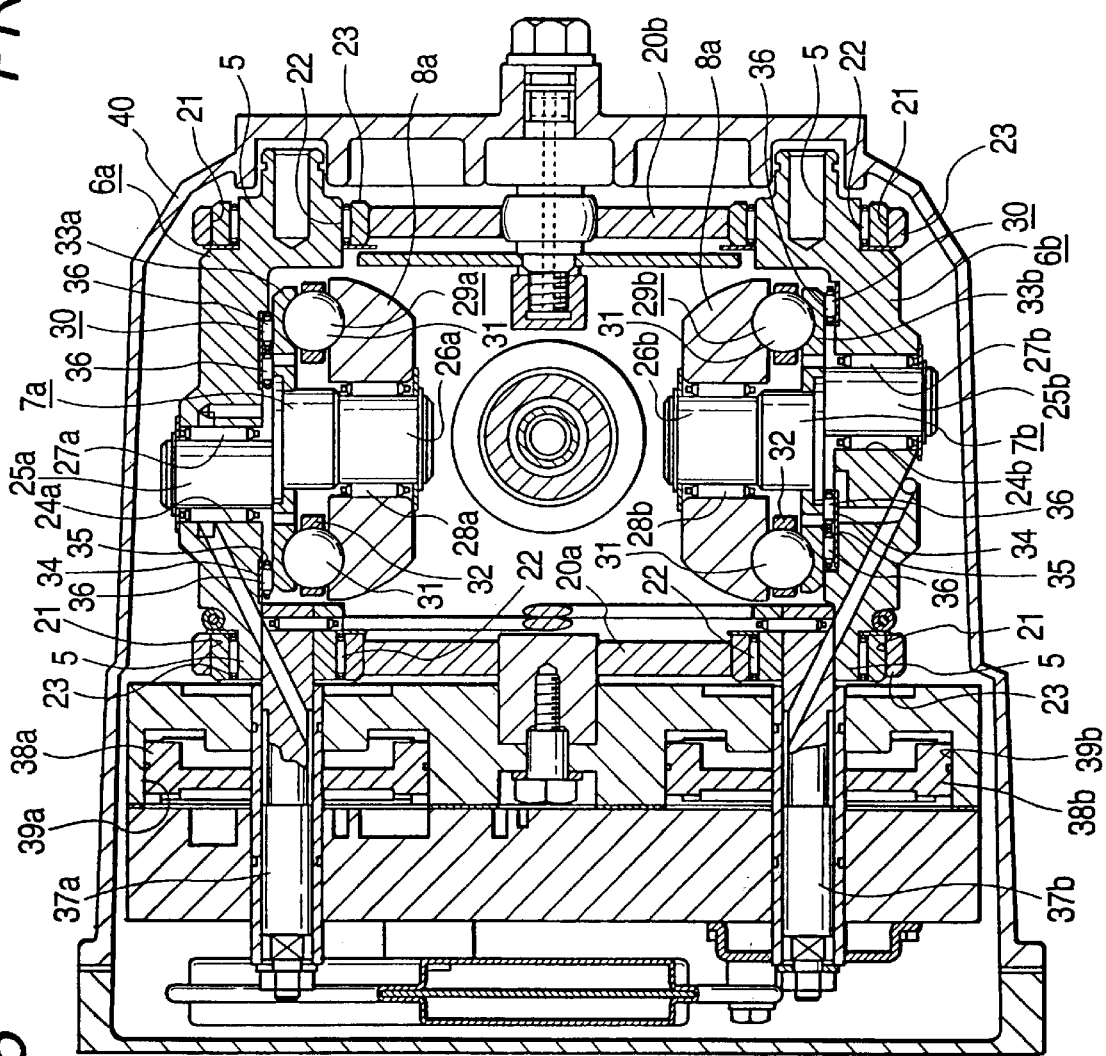
FIG. 6 shows a cross-section cut by line 6—6 in FIG. 5.

FIGS. 1 and 2 show a first embodiment of the present invention. The shown embodiment shows a measuring apparatus incorporating therein both of an apparatus for measuring the amount of pivotal displacement of a power roller 8 and an apparatus for measuring the amount of axial displacement of a displaceable shaft 7. When constructing an actual measuring apparatus, it is advantageous for achieving the efficiency of measuring work to make the above-mentioned amount of pivotal displacement and the above-mentioned amount of axial displacement measurable by a measuring apparatus, as in the shown embodiment. A constituent portion for measuring the amount of pivotal displacement appears in FIG. 1, and a constituent portion for measuring the amount of axial displacement appears in FIG. 2.

Figure 7:
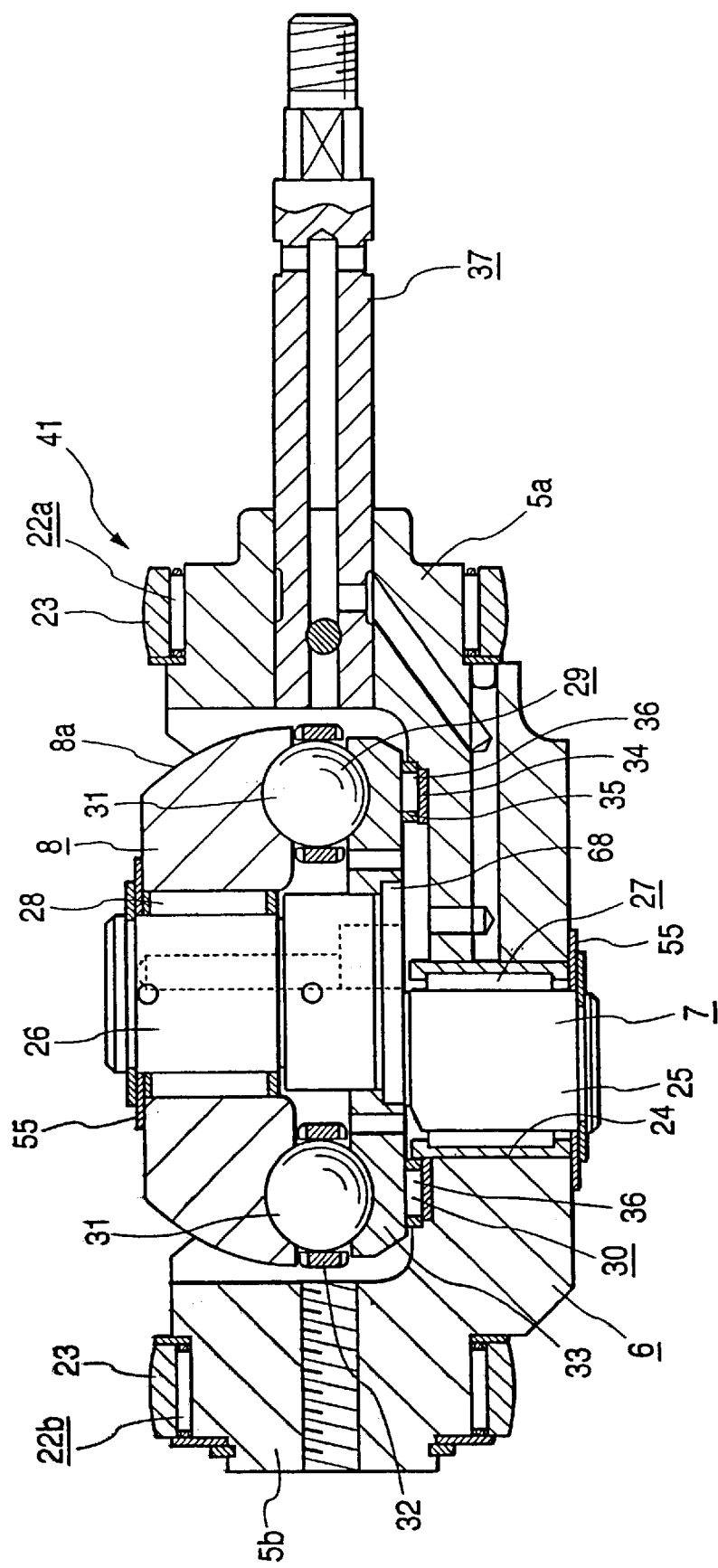
FIG. 7 is a cross-sectional view of an example of the toroidal type continuous variable speed transmission of the conventional type.
Figure 8:
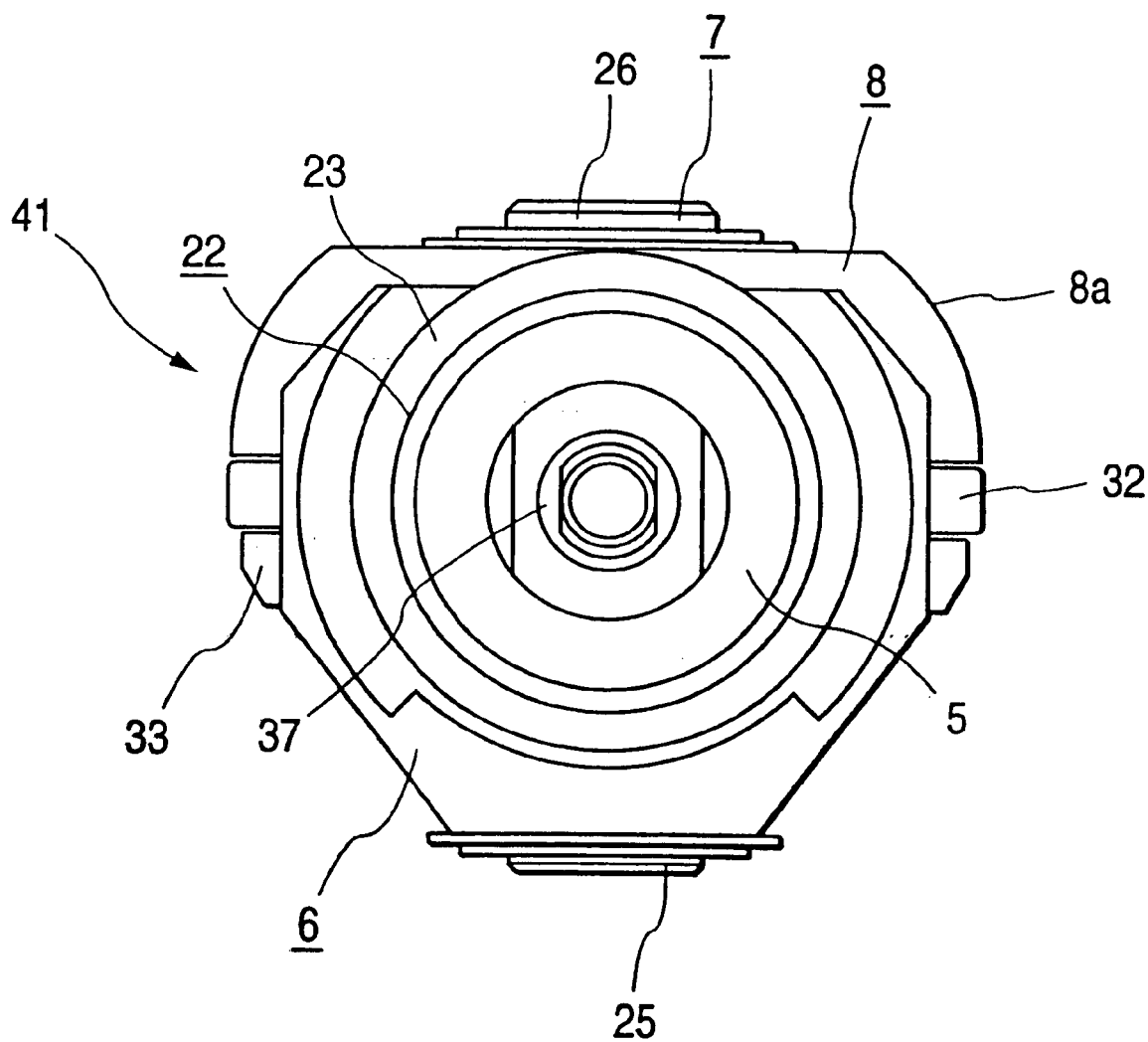
FIG. 8 is a cross-sectional view of the toroidal type continuous variable speed transmission shown in FIG. 7 as it is seen from the right side of FIG. 7.

First, reference is had chiefly to FIG. 1 to describe the constituent portion for measuring the amount of pivotal displacement of the power roller 8. This constituent portion for measuring the amount of pivotal displacement of the power roller 8 is provided with a pair of pedestals 42 such as V blocks (see FIGS. 1 and 2). The pedestals 42 support on the upper surface thereof a pair of pivots 5 provided concentrically with each other at the opposite end portions of a trunnion 6 constituting the power roller unit 41 for the toroidal type continuous variable speed transmission as shown in FIGS. 7 and 8, through radial needle bearings 22, with the power roller 8 positioned above the trunnion 6.

Above such pedestals 42, radial needle bearing hold-down actuators 43 (see FIG. 2) which are hold-down means for pivots are longitudinally (vertically) disposed by the cylinder portions 44 of these actuators 43 being supported on a fixed portion (not shown) such as a frame. These two radial needle bearing hold-down actuators 43 are extended and outer rings 23 constituting the radial needle bearings 22 are held down on the pedestals 42 by hold-down pads 46 provided on the tip end portions (the lower end portions) of output rods 45, whereby the pivots 5 can be supported in a predetermined positional relation on the upper surfaces of the pedestals 42.

Also, in such a manner as to sandwich the trunnion 6 supported so as to be hung over the pedestals 42 from the width wisely opposite sides, a pair of right and left pivotally movable actuators 47a, 47b constituting pivotally driving means are laterally (horizontally) disposed by the cylinder portions 48a, 48b of these pivotally movable actuators 47a, 47b being supported on the fixed portion (not shown) such as the frame. The pivotally movable actuators 47a, 47b are extended and the two diametrically opposite locations of the outer peripheral edge of the power roller 8 can be pressed diametrically inwardly of this power roller 8 by pressing pads 50a, 50b provided on the tip end portions of output rods 49a, 49b.

The pivotally driving means constituted by the pair of pivotally movable actuators 47a, 47b as described above changes the pressure of working fluid fed into these pivotally movable actuators 47a, 47b, and changes the force with which the pivotally movable actuators 47a, 47b press the power roller 8, thereby pivotally displacing this power roller 8 about the support shaft portion 25 constituting the displaceable shaft 7 (see FIG. 2). That is, if the pressure of the working fluid supplied to the right pivotally movable actuator 47a as viewed in FIG. 1 is made high and the pressure of the working fluid supplied to the left pivotally movable actuator 47b is made low, the power roller 8 is pivotally displaced to the left as viewed in FIG. 1. If conversely, the pressure of the working fluid supplied to the left pivotally movable actuator 47b as viewed in FIG. 1 is made high and the pressure of the working fluid supplied to the right pivotally movable actuator 47a is made low, the power roller 8 is pivotally displaced to the right as viewed in FIG. 1. It is also possible to displace the power roller 8 to a position in which it interferes with the trunnion 6 when this power roller 8 is pivotally displaced as described above, but it is also possible not to cause the power roller 8 and the trunnion 6 to interfere with each other, by adjusting the strokes of the two pivotally movable actuators 47a, 47b.

The amount of pivotal displacement of the power roller 8 about the support shaft portion 25 by the pivotally driving means as described above is measured by a length measuring machine 51 such as a linear scale constituting pivotal displacement measuring means. This length measuring machine 51 has the tip end of its gauge head 52 rammed against a backing plate 53 fixed to a pressing pad 50 with its main body portion supported on a fixed portion such as the frame, not shown. Accordingly, the length measuring machine 51 detects the amount of pivotal displacement of the power roller 8 as the amount of displacement of the pressing pad 50.

Next, reference is had chiefly to FIG. 2 to describe a constituent portion for measuring the amount of axial displacement of the displaceable shaft 7. The amount of axial displacement of this displaceable shaft 7 is important for judging whether this displaceable shaft 7 can be smoothly pivotally displaced about the support shaft portion 25 thereof relative to the trunnion 6, whether the power roller 8 can smoothly rotate about the pivotally supporting shaft portion 26 of the displaceable shaft 7, and whether there is any excessive backlash in the mounted portion of this displaceable shaft 7. That is, the trunnion 6, the displaceable shaft 7 and the power roller 8, as shown in FIG. 2, are unseparably coupled together by washers 55 being supported on the end portions of the support shaft portion 25 and pivotally supporting shaft portion 26 constituting the displaceable shaft 7 by snap rings 54. Accordingly, if the spacing between these washers 55 and the partner surfaces is too short, the pivotal displacement o f the displaceable shaft 7 and the rotation of the power roller 8 will not smoothly take place. If conversely, the spacing between the washers 55 and the partner surfaces is too long, excessive backlash will occur to the mounted portion of the displaceable shaft 7. Also, a gap present in the fitted portion between a flange portion 68 provided on the intermediate portion of the displaceable shaft 7 and the outer ring 33 may cause a similar problem to arise. That is, slight gaps of a regulated size with respect to the axial direction of the displaceable shaft 7 are present between the washer 55 fitted on the end portion of the support shaft portion 25 and the outer side of the trunnion 6, between the washer 55 fitted on the end portion of the pivot shaft portion 26 and the inner end surface of the power roller 8, and in the fitted portion between the flange portion 68 provided on the intermediate portion of the displaceable shaft 7 and the outer ring 33. On the basis of the presence of the gaps in these respective portions, the displaceable shaft 7 incorporated in the power roller unit for the toroidal type continuous variable speed transmission is axially displaced. So, by measuring the amount of axial displacement, whether the gaps present between the washers 55 and the partner surfaces, and in the fitted portion between the flange 68 and the outer ring 33 are proper is judged.

In order to measure the amount of axial displacement for such a purpose, a power roller hold-down actuator 56 which is hold-down means for the power roller is longitudinally (vertically) disposed by supporting the cylinder portion 57 of this power roller hold-down actuator 56 on a fixed portion such as the frame, not shown. The power roller hold-down actuator 56 is extended and the power roller 8 is held down toward the trunnion 6 by a hold-down pad 59 provided on the tip end portion (the lower end portion) of an output rod 58, whereby the power roller 8 can be prevented from floating up during the work of measuring the amount of axial displacement. The hold-down pad 59 also continues to hold down the power roller 8 when this power roller 8 is pivotally displaced by the aforedescribed pivotally driving means. Accordingly, the hold-down pad 59 is made of a material having a low coefficient of friction such as polyamide resin like MC nylon so that the inner end surface (the upper end surface as viewed in FIGS. 1 and 2) of the power roller 8 may not be damaged with the work of measuring the amount of pivotal displacement.

A pair of lower and upper shaft driving actuators 61a, 61b constituting axially driving means with the displaceable shaft 7 sandwiched between the axially opposite sides are longitudinally (vertically) disposed by supporting the cylinder portions 62, 62 of these shaft driving actuators 61a, 61b on a fixed portion such as the frame, not shown. The shaft driving actuators 61a, 61b are extended and the axially opposite end surfaces of the displaceable shaft 7 can be pressed toward the axially central side of this displaceable shaft 7 by pressing pads 64, 64 provided on the tip end portions of output rods 63, 63.

The axially driving means constituted by the pair of shaft driving actuators 61a, 61b as described above changes the pressure of working fluid fed into these two shaft driving actuators 61a, 61b, and changes the force with which these two shaft driving actuators 61a, 61b press the displaceable shaft 7, thereby axially displacing this displaceable shaft 7. That is, if the pressure of the working fluid supplied to the lower shaft driving actuator 61a as viewed in FIG. 2 is made high and the pressure of the working fluid supplied to the upper shaft driving actuator 61b is made low, the displaceable shaft 7 is displaced upwardly as viewed in FIG. 2. If conversely, the pressure of the working fluid supplied to the upper shaft driving actuator 61b as viewed in FIG. 2 is made high and the pressure of the working fluid supplied to the lower shaft driving actuator 61a is made low, the displaceable shaft 7 is displaced downwardly as viewed in FIG. 2.

The amount of axial displacement of the displaceable shaft 7 by the axially driving means as described above is measured by a length measuring machine 65 such as a linear scale constituting axial displacement measuring means. This length measuring machine 65 has the tip end of its gauge head 66 rammed against a backing plate 67 fixed to a pressing pad 64 with its main body portion supported on a fixed portion such as the frame, not shown. Accordingly, the length measuring machine 65 detects the amount of axial displacement of the displaceable shaft 7 as the amount of displacement of the pressing pad 64.

According to the measuring apparatus of the present invention for a power roller unit for a toroidal type continuous variable speed transmission constructed as described above, whether the constituent parts of the power roller unit for the toroidal type continuous variable speed transmission function properly can be efficiently measured. First, the amount of pivotal displacement for judging whether the power roller 8 rotatably supported around the pivot shaft portion 26 of the displaceable shaft 7 is properly pivotally displaced, in other words, whether the displaceable shaft 7 rotatably supporting this power roller 8 through the radial needle bearing 28 is properly pivotally displaced about the support shaft portion 25 supported relative to the trunnion 6 by the radial needle bearing 27 provided inside the circular hole 24 in the trunnion 6 can be efficiently measured by the constituent portion for measuring the amount of pivotal displacement of the power roller 8 which is shown chiefly in FIG. 1.

Also, the amount of axial displacement for judging whether the displaceable shaft 7 is assembled to the trunnion 6 and the power roller 8 with a desired axial gap can be efficiently measured by the constituent portion for measuring the amount of axial displacement of the displaceable shaft 7 which is shown chiefly in FIG. 2. These series of measuring operations can be automatically performed and therefore, the stabilization of the performance and an improvement in the reliability of the toroidal type continuous variable speed transmission can be achieved by carrying out the total inspection of the power roller unit 41 for the toroidal type continuous variable speed transmission.

The measuring apparatus of the present invention for the power roller unit for the toroidal type continuous variable speed transmission is constructed and acts as described above and therefore, a reduction in the costs of the toroidal type continuous variable speed transmission can be achieved by making the assembling work and inspecting work for the toroidal type continuous variable speed transmission efficient.

What is claimed is:

1. A measuring apparatus for a power roller unit for a toroidal continuously variable speed transmission, the power roller unit having a trunnion with concentric pivot portions at opposite ends thereof, a pair of bearings disposed around the pivot portions, a displaceable shaft including a first portion rotatably disposed in a hole formed in the trunnion, and a second portion having a power roller rotatably supported thereon, the measuring apparatus comprising:

a pair of pedestals having upper surfaces adapted to support the pivot portions of the trunnion;

a first hold-down system operative to press the bearings against the upper surfaces of the pedestals; and a second hold-down system operative to press the power roller toward the trunnion;

drive system operative to displace at least one of the power roller and the displaceable shaft; and a measuring system operative to measure displacement of the at least one of the power roller and the displaceable shaft by the drive system.

2. A measuring apparatus according to claim 1, wherein the drive system is operative to axially displace the displaceable shaft, and the measuring system measures axial displacement of the displaceable shaft.

3. A measuring apparatus according to claim 2, wherein the drive system includes an actuator that presses an axial end of the displaceable shaft to effect the axial displacement.

4. A measuring apparatus according to claim 1, wherein the drive system is operative to pivotally displace the power roller about the second portion of the displaceable shaft, and the measuring system measures the pivotal displacement of the power roller.

5. A measuring apparatus according to claim 4, wherein the drive system is operative to axially displace the displaceable shaft, and the measuring system measures axial displacement of the displaceable shaft.

6. A measuring apparatus according to claim 4, wherein the drive system includes a pair of actuators that press diametrically opposite portions of the power roller to effect the pivotal displacement.

7. A measuring apparatus according to claim 6, wherein the drive system is operative to axially displace the displaceable shaft, and the measuring system measures axial displacement of the displaceable shaft.

8. A measuring apparatus according to claim 7, wherein the drive system includes an actuator that presses an axial end of the displaceable shaft to effect the axial displacement.

9. A measuring apparatus for a power roller unit for a toroidal type continuously variable speed transmission, comprising:

a trunnion having concentric pivots secured to opposite end surfaces thereof:

a pair of first radial bearings provided around said pivots;

a circular hole formed in an intermediate portion of said trunnion in a direction perpendicular to the axial direction of each of said pivots;

a support shaft portion and a pivotally supporting-shaft portion parallel to and eccentric from each other, said pivotally supporting shaft portion being rotatably supported inside said circular hole through a second radial bearing;

a power roller rotatably supported around said pivotally supporting shaft portion through a third radial bearing;

first and second thrust bearings provided between an outer side of said power roller and an inner side of the intermediate portion of said trunnion in series with each other with respect to the acting direction of a thrust load;

a pair of pedestals supporting on upper surfaces thereof said pivots provided on the opposite end portions of said trunnion through said pair of first radial bearings with said power roller positioned above said trunnion;

a pivot hold-down system operative to hold down each of said first radial bearings on the upper surface of each of said pedestals;

a power roller hold-down system operative to hold down said power roller toward said trunnion; and a displacement measuring system operative to measure at least one of displacement of the displaceable shaft and displacement of the power roller, wherein said measuring apparatus for the power roller unit measures movement of the power roller unit for the toroidal continuously variable speed transmission in the positional relation after the completion of the assembly of said toroidal continuously variable speed transmission before said trunnion, said first, second and third radial bearings, said displaceable shaft, said power roller and said first and second thrust bearings which are elements discrete from one another are assembled to said toroidal type continuously variable speed transmission.

10. A measuring apparatus according to claim 9, further comprising:

a driving actuator system operative to press two diametrically opposite portions of said power roller with respect to a widthwise direction of said trunnion to thereby pivotally displace said power roller about said support shaft portion; and wherein said displacement measuring system includes a pivotal displacement measuring device that measures the amount of displacement of said power roller by said driving actuator system.

11. A measuring apparatus according to claim 9, further comprising:

an axially driving actuator operative to axially displace said displaceable shaft; and wherein said displacement measuring system includes an axial displacement measuring device that measures the amount of displacement of said displaceable shaft by said axially driving actuator.

12. A measuring apparatus for a power roller unit for a toroidal continuously variable speed transmission, comprising:

a trunnion having concentric pivots secured to opposite end surfaces thereof;

a pair of first radial bearings provided around said pivots;

a circular hole formed in an intermediate portion of said trunnion in a direction perpendicular to the axial direction of each of said pivots;

a displaceable shaft including a support shaft portion and a pivotally supporting shaft portion parallel to and eccentric from each other, said pivotally supporting shaft portion being rotatably supported inside said circular hole through a second radial bearing;

a power roller rotatably supported around said pivotally supporting shaft portion through a third radial bearing;

first and second thrust bearings provided between an outer side of said power roller and an inner side of the intermediate portion of said trunnion in series with each other with respect to the acting direction of a thrust load;

a pair of pedestals supporting on upper surfaces thereof said pivots provided on the opposite end portions of said trunnion through said pair of first radial bearings with said power roller positioned above said trunnion;

pivot hold-down means for holding down each of said first radial bearings on the upper surface of each of said pedestals;

power roller hold-down means for holding down said power roller toward said trunnion; and displacement measuring means for measuring at least one of displacement of the displaceable shaft and displacement of the power roller, wherein said measuring apparatus for the power roller unit measures movement of the power roller unit for the toroidal continuously variable speed transmission in the positional relation after the completion of the assembly of said toroidal continuously variable speed transmission before said trunnion, said first, second and third radial bearings, said displaceable shaft, said power roller and said first and second thrust bearings which are elements discrete from one another are assembled to said toroidal continuously variable speed transmission.

13. A measuring apparatus for a power roller unit for a toroidal continuously variable speed transmission according to claim 12, further comprising:

pivotally driving means for pressing two diametrically opposite portions of said power roller with respect to the widthwise direction of said trunnion to thereby pivotally displace said power roller about said support shaft portion; and wherein said displacement measuring means includes pivotal displacement measuring means for measuring the amount of displacement of said power roller by said pivotally driving means.

14. A measuring apparatus for a power roller unit for a toroidal continuously variable speed transmission according to claim 12 further comprising:

axially driving means for pressing axially opposite end surface of said displaceable shaft to thereby axially displace said displaceable shaft; and wherein said displacement measuring means includes axial displacement measuring means for measuring the amount of displacement of said displaceable shaft by said axially driving means.

* * * * *